US009078389B2

(12) United States Patent
Pastour (10) Patent No.: US 9,078,389 B2
(45) Date of Patent: Jul. 14, 2015

(54) SLEEVE HITCH MOUNT CORE AERATOR

(71) Applicant: Shane Pastour, Ankeny, IA (US)

(72) Inventor: Shane Pastour, Ankeny, IA (US)

( * ) Notice: Subject to any disclaimer, the term of this patent is extended or adjusted under 35 U.S.C. 154(b) by 106 days.

(21) Appl. No.: 13/789,752

(22) Filed: Mar. 8, 2013

(65) Prior Publication Data

US 2013/0292145 A1 Nov. 7, 2013

Related U.S. Application Data

(60) Provisional application No. 61/608,167, filed on Mar. 8, 2012.

(51) Int. Cl.
*A01B 45/02* (2006.01)

(52) U.S. Cl.
CPC ............... *A01B 45/026* (2013.01); *A01B 45/02* (2013.01)

(58) Field of Classification Search
USPC ...................................................... 172/21, 22
IPC ........................................... A01B 45/02,45/023
See application file for complete search history.

(56) References Cited

U.S. PATENT DOCUMENTS

| 3,643,746 | A | * | 2/1972 | Dedoes | 172/445 |
|---|---|---|---|---|---|
| 3,650,331 | A | * | 3/1972 | Dedoes | 172/21 |
| 5,029,652 | A | * | 7/1991 | Whitfield | 172/21 |
| 5,209,306 | A | * | 5/1993 | Whitfield | 172/21 |
| 6,659,190 | B2 | * | 12/2003 | Jessen | 172/21 |
| 7,070,005 | B2 | * | 7/2006 | Maas et al. | 172/22 |
| 7,341,115 | B2 | * | 3/2008 | Maas et al. | 172/22 |
| 7,779,929 | B2 | * | 8/2010 | Maas et al. | 172/21 |
| 8,079,422 | B2 | * | 12/2011 | Maas et al. | 172/21 |
| 8,640,784 | B2 | * | 2/2014 | Jones | 172/22 |
| 8,662,193 | B2 | * | 3/2014 | Hill | 172/21 |

* cited by examiner

*Primary Examiner* — Gary Hartmann
(74) *Attorney, Agent, or Firm* — McKee, Voorhees & Sease, PLC

(57) ABSTRACT

A tow behind aerator is provided for connected with a hitch of a garden tractor. The aerator includes a connection, a float, a pivot, and an aerator body. The float allows for the aerator to ride on variations of terrain and elevation. The pivot allows the aerator body to pivot or rotate relative to the tractor such that the aerator is able to turn around objects. The pivot may be engaged or disengaged to control the amount of pivot. Further, the aerator includes a self-centering function for centering the aerator when raising the aerator to a non-aerating configuration. A universal sleeve hitch may be used to connect the aerator to the tractor and can be operated to raise and lower the aerator.

11 Claims, 13 Drawing Sheets

SLEEVE HITCH MOUNT CORE AERATOR

CROSS-REFERENCE TO RELATED APPLICATIONS

This application claims priority under 35 U.S.C. §119 to provisional application Ser. No. 61/608,167, filed Mar. 8, 2012, which is hereby incorporated in its entirety.

FIELD OF THE INVENTION

The present invention is generally related to aerators. More particularly, but not exclusively, the invention relates to an apparatus for aerating that is attached to a common sleeve hitch of a garden tractor, and that allows for turning while aerating.

BACKGROUND OF THE INVENTION

Lawn aeration involves making holes in the lawn either by pushing a rod into the lawn or by "coring," which includes extracting a plug of soil. By aerating your lawn you provide the following benefits to your lawn and its root system: oxygen gets to the roots and the soil allowing it to "breathe"; organic fertilizers and nutrients get access to the root system; water is able to better soak the soil and reach the root system; helps to break up thatch; and tight, compacted soil is loosened up allowing the root system to grow.

Presently, lawn aeration is done by either a walk behind aerator, or a tow behind aerator. Walk behind aerators are similar to push lawn mowers, in that an operator pushes the aerator around a lawn while the machine cores the lawn. Therefore, walk behind aerators are limited by the speed of walking. Furthermore, as walk behind aerators need to be controlled by an operator, the size is limited. Typical walk behind aerators are limited to a 19-20 inch width of ground that can be aerated by each pass of the machine. Thus, walk behind aerators cause the aerating jobs to take longer, and are more tiring to the operator.

Tow behind aerators generally include aerators that can be attached to a garden tractor, as well as aerators that are attached via a three-point hitch to larger, sub compact tractors. Tow behind aerators that can be attached to a garden tractor are limited by the fact that they have to be manipulated, i.e. the rotating tines have to be raised, when the aerator is to cross a sidewalk, driveway, porch, or other structure that could be damaged by the rotating tines. The combination of straight lines and having to manipulate the aerators adds a great amount of time to the aerating process, and limits the area of lawn that can be aerated by the device.

Aerators that can be attached via a three-point hitch of a larger, sub compact tractor are also limited in use. The sub compact tractors are much more expensive than garden tractors, on the magnitude of approximately five times more expensive. Furthermore, while the larger tractors are able to support a wider aerator, problems exist when the lawn includes a gate or narrow pass between houses or other objects. The tractor and aerator are not able to fit between the narrower passes. The three point hitches also have the problem of only allowing the aerator to follow in a straight line. Any turning can tear up a lawn.

Therefore, there is a need in the art for a tow behind aerator that overcomes the deficiencies in the art, such as attaching to a garden tractor, being able to turn while aerating, and attaching such that it is not cumbersome to cross a concrete, stone, or other material to reach an additional part of a yard.

SUMMARY OF THE INVENTION

It is therefore a primary object, feature, and/or advantage of the present invention to provide an apparatus that overcomes the deficiencies in the art.

It is another object, feature, and/or advantage to provide an aerating apparatus that can attach to a garden tractor via a sleeve hitch.

It is yet another object, feature, and/or advantage of the present invention to provide an aerating apparatus that includes a pivot point that allows the aerator to turn while aerating.

It is still a further object, feature, and/or advantage of the present invention to provide an aerating apparatus that can be easily lifted and lowered.

It is another object, feature, and/or advantage to provide an aerating apparatus that is wider than a walk behind aerator, yet that can fit through a gate.

It is another object, feature, and/or advantage to provide an aerating apparatus that includes a float to allow the aerator to easily pass over various terrain or elevation changes.

These and/or other objects, features, and advantages of the present invention will be apparent to those skilled in the art. The present invention is not to be limited to or by these objects, features and advantages. No single embodiment need provide each and every object, feature, or advantage.

DETAILED DESCRIPTION OF THE PREFERRED EMBODIMENTS

FIGS. 1-7 are views of an aerator 10 that is adapted to be attached to a sleeve hitch 46 of a garden tractor 44. A sleeve hitch 46, as shown in FIGS. 8-12, attaches to the rear of a garden tractor 44 and allows an attachment to be raised and lowered relative to the garden tractor. The sleeve hitch includes an actuator or cylinder, which may be hydraulically powered or electrically powered via a linear actuator. The cylinder is extended and retracted to control the height of the attachment, and can be controlled via a control switch, which activates the cylinder. The control switch may be a toggle switch. The exact design of the sleeve hitch is not intended to be limiting of the present invention. For example, the sleeve hitch may be a universal sleeve hitch 50 to fit any model lawn or garden tractor 44, or can be a sleeve hitch 46 that is specific to a type and/or model of lawn or garden tractor 44.

Referring back to FIGS. 1-7, various views of the aerator 10 of the present invention are shown, and the various components will be described in relation to the figures. The aerator 10 includes a connection 12, float 14, pivot 16, and body 18. The aerator 10 will be attached to a sleeve hitch 46 of a garden tractor 44 at a connection 12. The connection 12 is a generally C-shaped member having apertures through a top and bottom portion to receive a pin or other connection from the sleeve hitch. The connection 12 is connected to a float 14. The float 14 includes a bar that is pivotally connected to the pivot 16. The bar may be a hollow square or rectangular tube, or may take various other shapes, such as flat bars or rods even. The float includes a pivot point, which may comprise a rod, between the connection and the pivot 16 of the aerator 10. The pivot point allows the aerator to pivot to adjust for varying elevations of terrain, including hills or other bumps. Furthermore, the float 14 provides so that the sleeve hitch 46 does not have to provide a down force on the aerator 10 to provide proper aerating.

In addition, the bar comprising the float 14 may be removed in some embodiments. For example, the connection 12 may be directly connected to the float rod 14. In this embodiment, the connection 12 may be widened to approximately match the width of the pivot arm 24. The float 14, which in this cases would comprise the rotatable rod (see FIG. 2), would be connected to the connection 12 such that the connection would rotate with the float, which would allow for the aerator to penetrate the ground even when there is a change in ground elevation. Put another way, the present invention contemplates that the square tubing between the float 14 and the connection 12 need not be required in all embodiments, but that the aerator is still able to float.

The pivot 16 of the aerator 10 includes a top pivot arm 22, a bottom pivot arm 24, and a pivot rod 20 extending therebetween. As shown in FIGS. 1-7, the pivot 16 may also include first and second side arms 17, 19 to provide for greater stability for the aerator 10. However, it should be appreciated that these side arms 17, 19 are not required in all embodiments. The pivot rod 20 is operatively connected to a pivot body arm 28 that extends from the pivot 16 to the body 18. The pivot body arm 28 is welded or otherwise affixed to the pivot rod 20 such that the pivot body arm 28 rotates with the pivot rod 20. It should be noted that the connection 12, float 14, and other components of the pivot 16 will not substantially rotate as the pivot rod 20, pivot body arm 28, and aerator body 18 pivot.

The pivot arms 22, 24 comprise a tube, such as square tubing. The square tubes may be welded together to provide stability for the aerator 10. However, it should be appreciated that other materials, including other shapes and sizes of tubes, may be used for the present invention. However, for the purposes of the present invention, the square tubes are 2" square tubes with ⅛" wall thickness. It should also be appreciated that the pivot rod 20 may include a bolt on the top side of the top pivot arm 22, as well as the bottom side of the bottom pivot arm 24 to keep the pivot rod in place and from falling through the pivot arms. However, a bolt is not required, and any element may be welded or affixed to the pivot rod that is wider than the hole through the pivot arms to aid the pivot arm in place.

Figure 1:
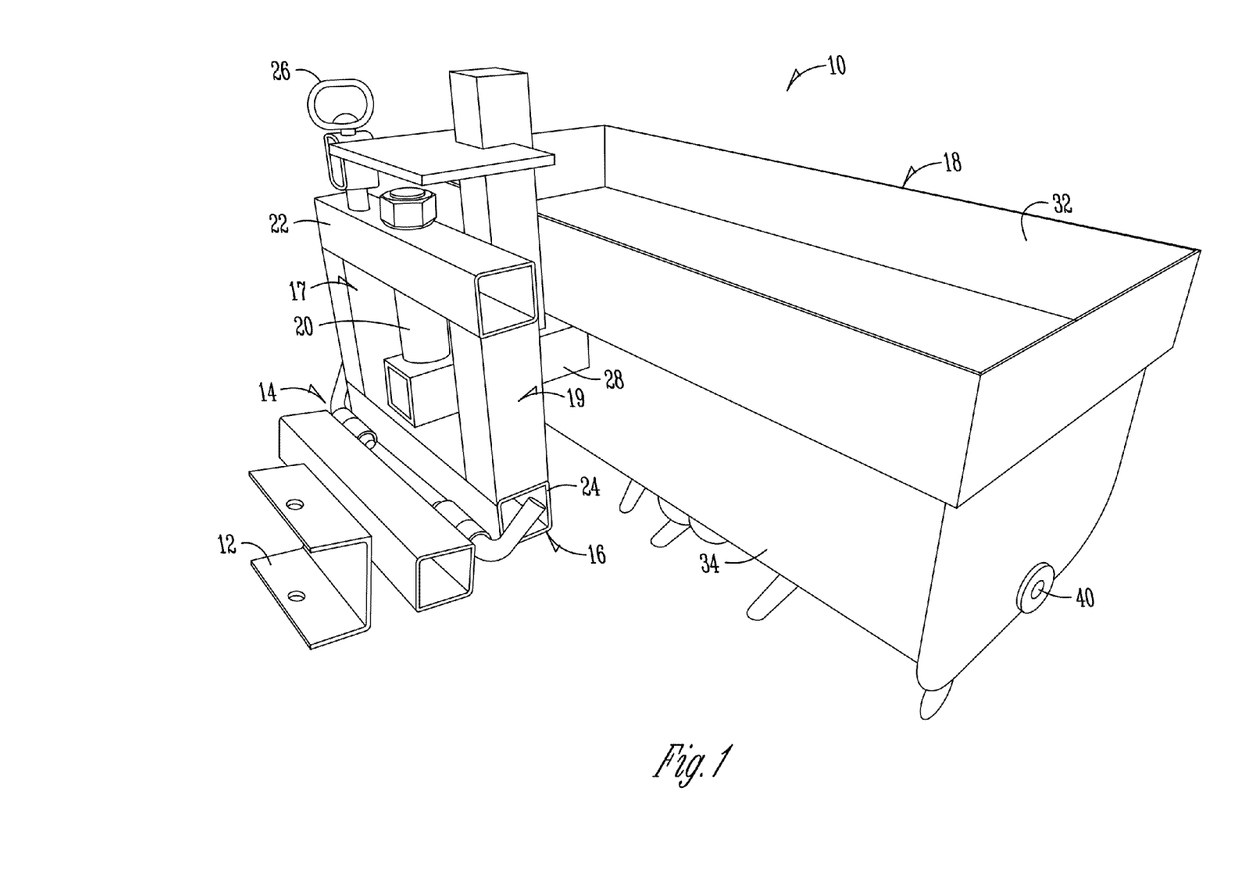
FIG. 1 is a front perspective view of an aerator according to the present invention.
Figure 5:
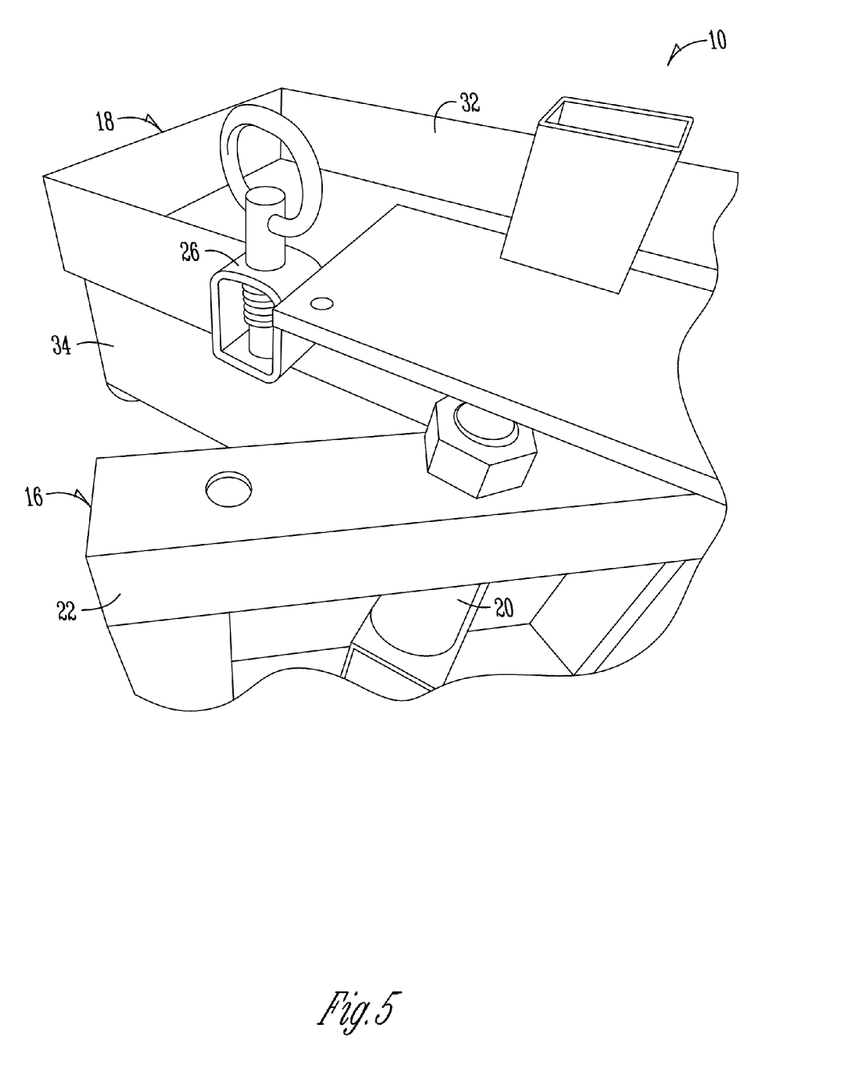
FIG. 5 is an enlarged view showing the pivot lock pin disengaged to the pivot to allow the aerator to turn.
Figure 6:
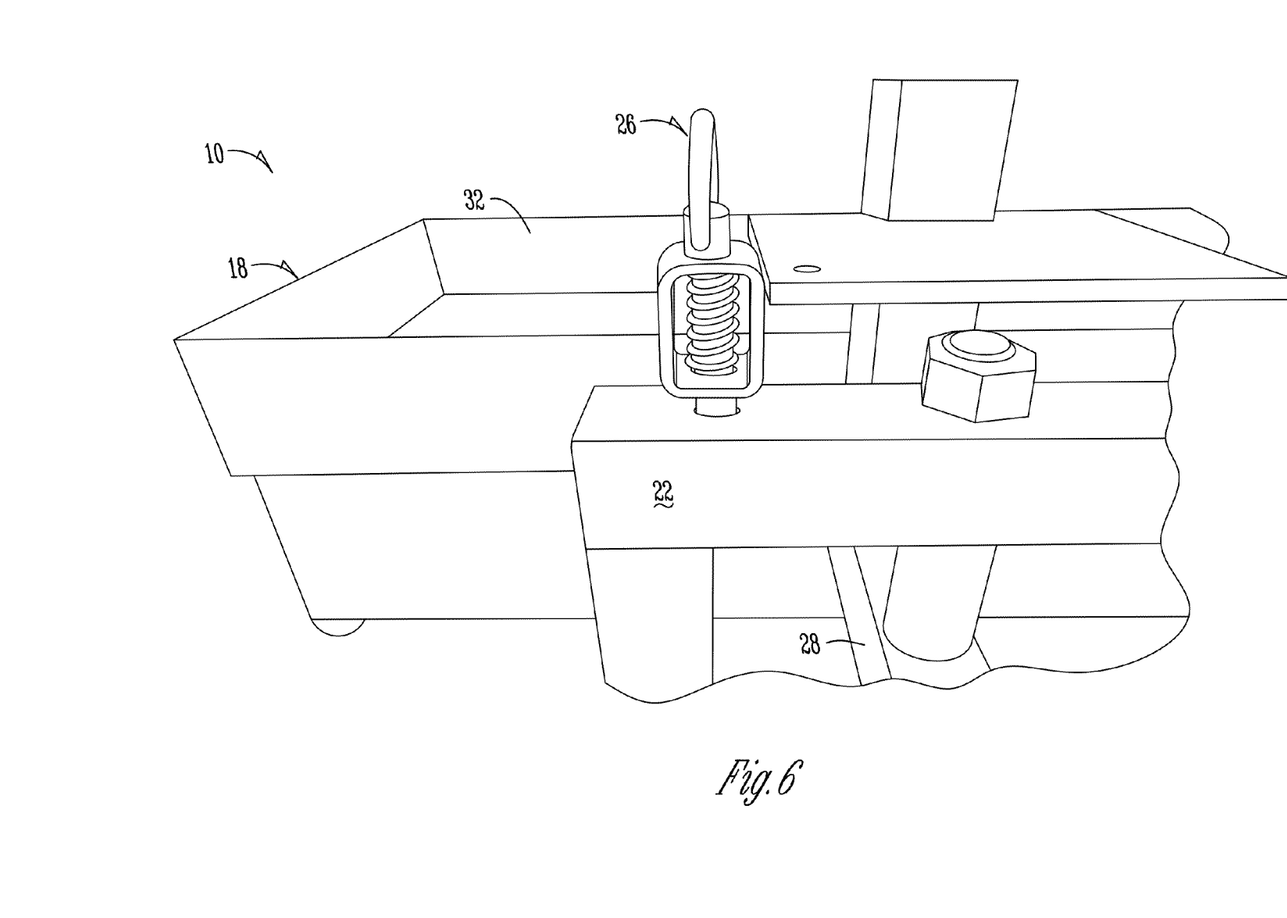
FIG. 6 is an enlarged view showing the pivot lock pin engaged to the pivot of the aerator.
Figure 7:
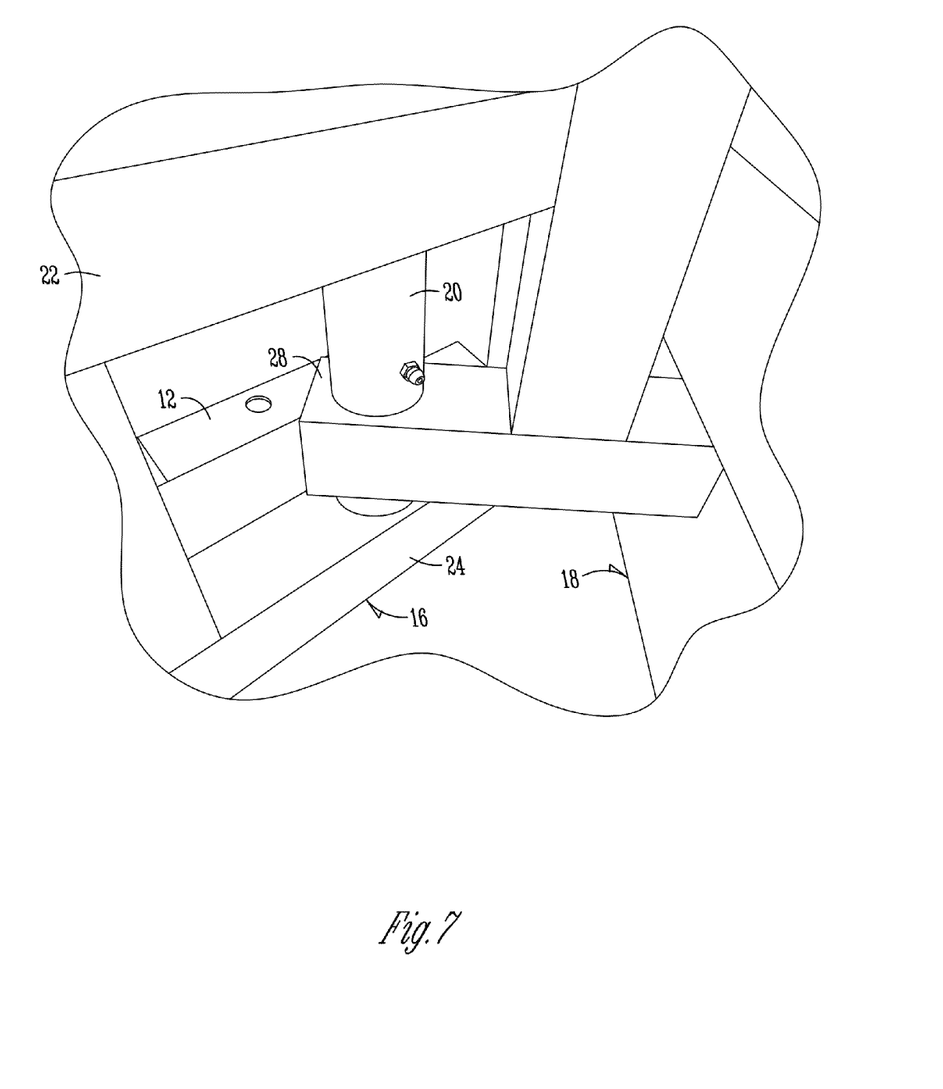
FIG. 7 is an enlarged view of the pivot and connection of the aerator of the present invention.

A pivot lock pin 26 is also provided with the aerator 10. The pivot lock pin 26 allows for the selective pivoting of the aerator body 18 relative to the connection 12 and pivot arms. The pivot lock pin 26 includes an arm that extends upwardly from the pivot body arm 28. The pivot lock pin is spring loaded and extends generally downward. Therefore, as shown in FIG. 1, the pivot lock pin may be locked in place through an aperture in a wall of the top pivot arm 22. In this position, the aerator 10 will not be allowed to rotate or pivot and will only be able to aerate in substantially straight lines. However, as shown in FIG. 5, the pivot lock pin may be disengaged from the top pivot arm 22 such that the aerator body 18 may pivot about the pivot rod 20 to allow the aerator 10 to turn along with the garden tractor. The pivoting and turning of the aerator 10 allows the aerator to turn around trees, landscaping, corners, etc.

While a pivot lock pin is shown to lock and unlock the pivoting of the aerator body 18, it should be appreciated that the pin need not be used, and other items lock the aerator in place. For example, a rod or bar, which may be known as a lock out bar, may extend from the top pivot arm 22 (in aperture therein) to an aperture in the body 18 of the aerator. The rigid rod or bar will mitigate the pivoting of the aerator 10, and will aid in keeping the aerator in a substantially straight path during use. The use of the lock out bar provides advantages. When the pivot is locked out, it allows a user to aerate while traveling in reverse, which was not possible in previous tow behind aerators.

Figure 2:
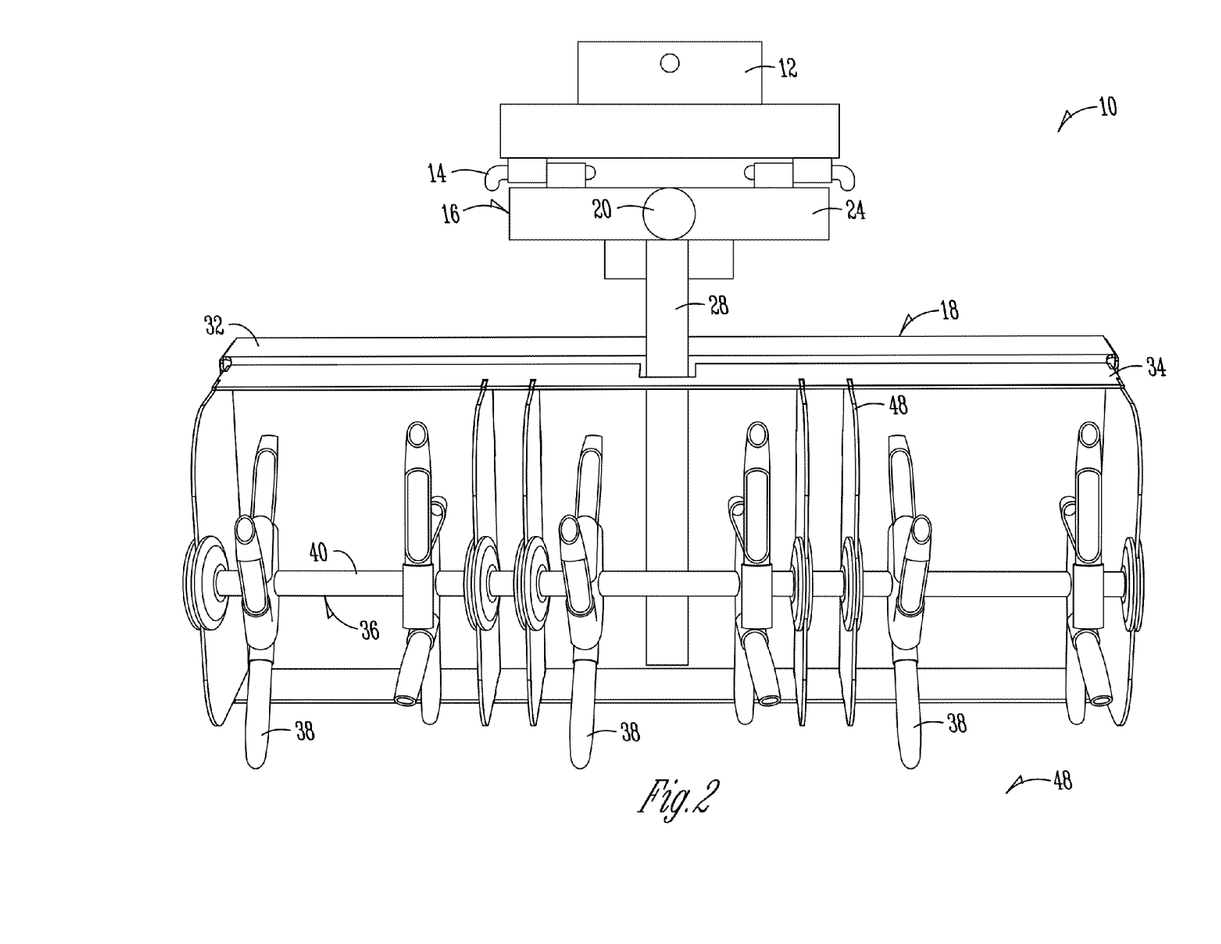
FIG. 2 is a bottom view of the aerator.

FIG. 2 is a bottom view of the aerator 10. FIG. 2 shows inside an enclosure 34 of the body 18 of the aerator 10. The enclosure comprises an outer wall of ⅛" plate steel, and includes dividers 48. Inside the enclosure is a plurality of coring tine assemblies 36. In the embodiment shown, the aerator 10 includes three coring tine assemblies 36. Each coring tine assembly 36 includes a tine shaft 40 and a plurality of coring tines 38 radially spaced on the shaft. The shaft comprises a 1" diameter solid steel shaft. The coring tines are hollow and comprise ¾" diameter coring tines with a core depth up to 4". The tines create plugs in a lawn, and are long lasting, durable, replaceable, and affordable. The embodiments shown include 24 coring tines positioned within the enclosure 34. As the coring tines are divided among coring tine assembly 36, when wear or tear requires replacement of the tines, only one assembly may be required to be replaced at a time. This prolongs the life of each coring tine assembly 36. According to the embodiment shown in FIG. 2, the aerating swath is 32" from outside tine reel to outside tine reel. This is advantageous as it is wider than traditional walk behind aerators, while being narrow enough to fit within gates and other narrow passes.

Figure 3:
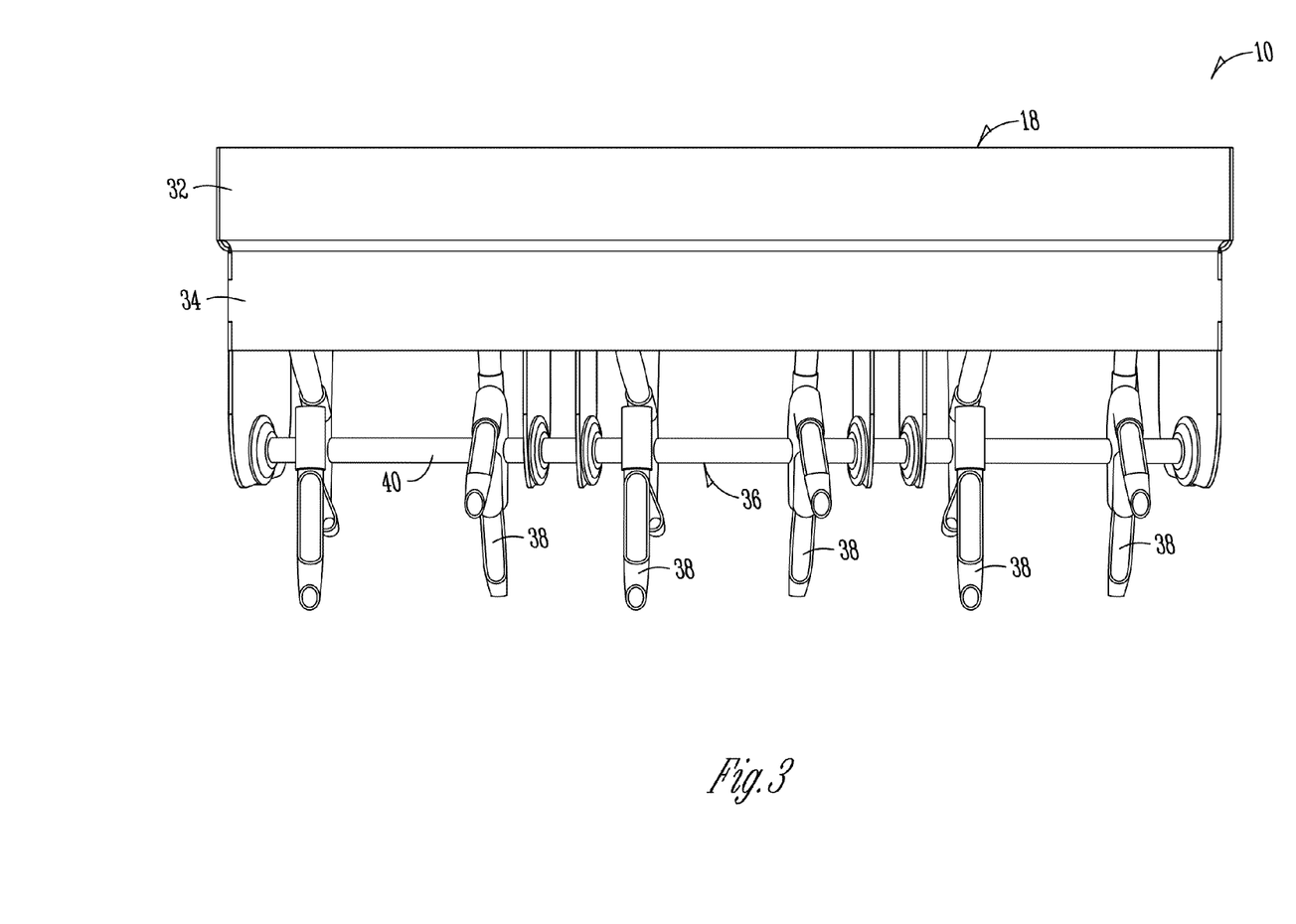
FIG. 3 is a rear plan view of the aerator.
Figure 4:
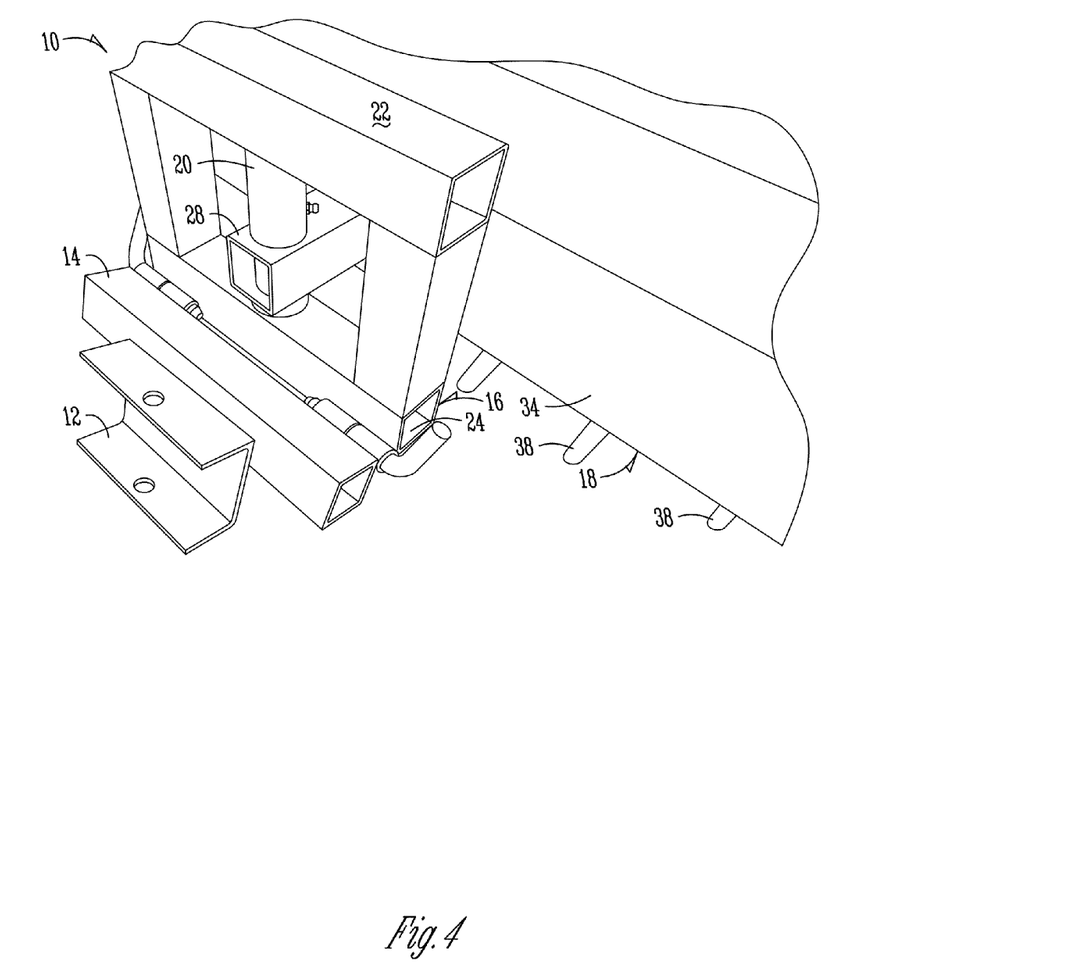
FIG. 4 is an enlarged view showing the connection, float, and pivot of the aerator.

FIG. 3 shows a rear portion of the aerator 10. FIG. 3 shows that the tines 38 of the tine assemblies 36 extend at least partially below the bottom of the enclosure 34. This configuration is beneficial, as the tines will be able to create plugs in the ground below the bottom of the enclosure 34. However, because the tines extend below the enclosure 34, the aerator 10 will need to be raised by the sleeve hitch 46 when crossing sidewalks, driveways, roads, porches, or other areas not to be aerated.

FIGS. 1 and 3 also show a box 32 positioned on the top of the body 18. The box is a recessed portion of the body 18, including walls comprising ⅛" steel plating. The configuration of the aerator 10, including the body 18, provides enough weight to create downforce of the aerator such that the tines 38 will penetrate a lawn to create plugs. However, if the lawn is dry or otherwise hard, weight, such as cylinder blocks, rocks, or the like may be placed within the box 32 to provide additional weight to the aerator 10. In addition, it is contemplated that the box 32 may be used to store tools and other equipment for the aerator, tractor, or lawn care in general. However, it should be noted that the box is not a requirement of the aerator 10 of the present invention, and is merely an addition that may be beneficial for the aerator 10.

Figure 8:
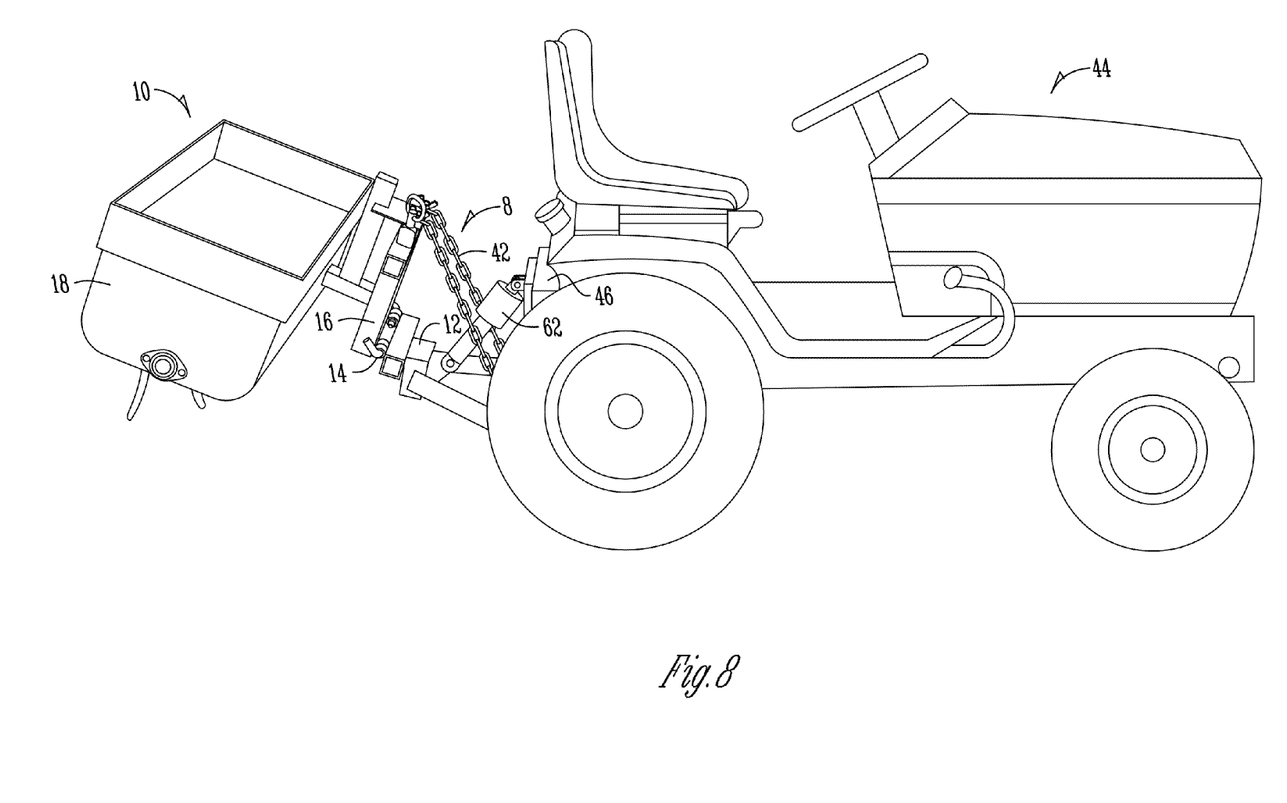
FIG. 8 is a side view of the aerator of the present invention attached to a garden tractor in a raised positioned.

Now referring to FIGS. 8-12, the use of the aerator will be described. FIG. 8 is a depiction of an assembly 8 including the aerator 10 attached to a sleeve hitch 46 of a garden tractor 44. The aerator 10 in FIG. 8 is shown in a raised or non-aerating position. As shown in the figure, the sleeve hitch 46 has raised the aerator 10 such the tines will not come in contact with the ground. It should also be noted that raising of the aerator is aided by a plurality of binder or limiter chains 42. The chains 42 extend from the sleeve hitch to a portion of the aerator near the pivot 16. The chains 42 aid in raising the aerator 10, limiting the amount of pivot, and centering the aerator 10.

Figure 9:
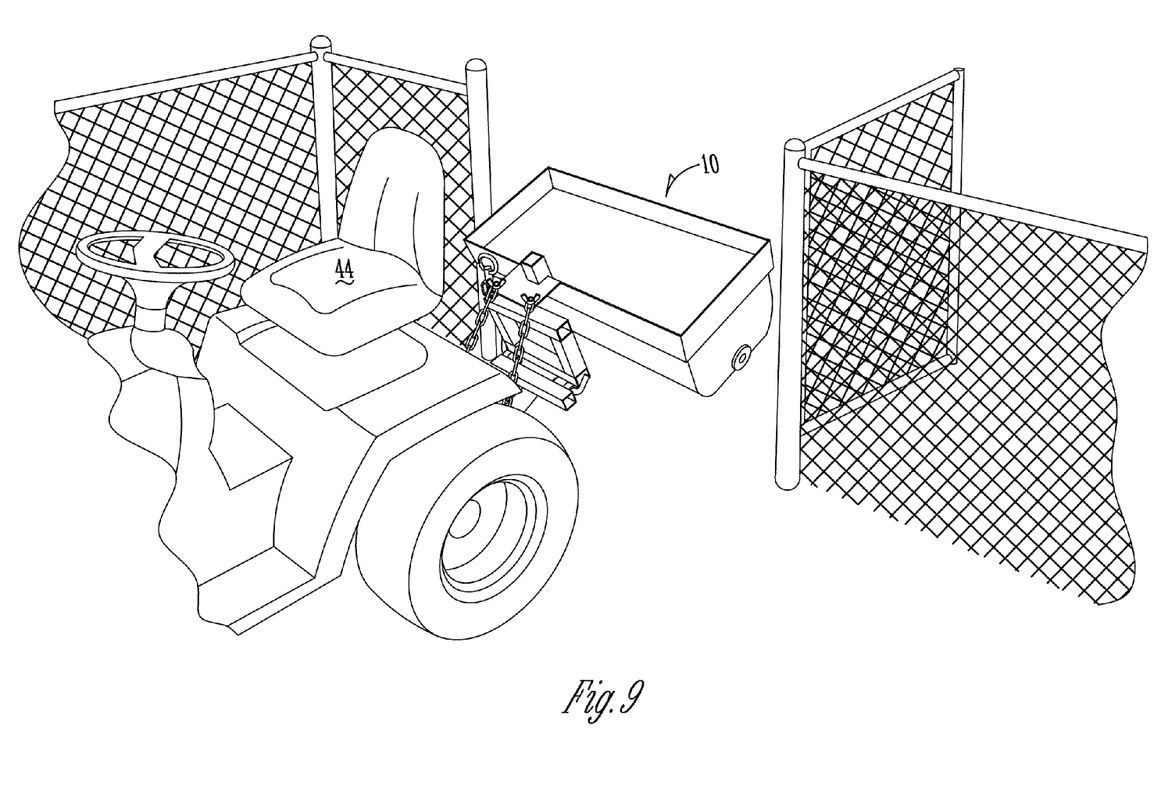
FIG. 9 is a top perspective view of the aerator attached to the tractor in a raised position.

FIG. 9 is another depiction of the aerator 10 in a raised or non-aerating position passing through a standard sized gate. As discussed above, the width of the aerator is smaller than width of a standard gate such that the aerator and tractor are able to pass through gates and other small passages with ease. This is advantageous over the prior art, as prior tow behind aerators are not able to fit between such standard size gates.

Figure 10:
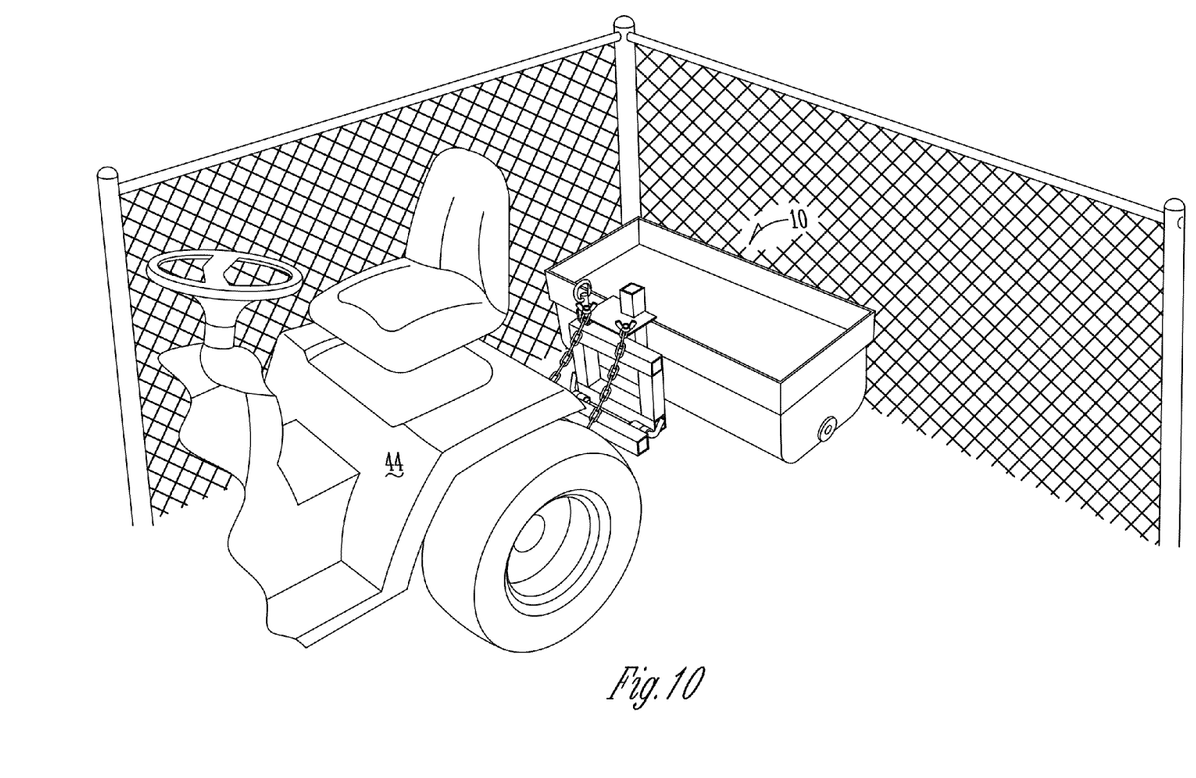
FIG. 10 is a top perspective view of the aerator attached to the tractor in a lowered or aerating position.

FIG. 10 is a depiction of the aerator 10 connected to the garden tractor 44 and in a down or aerating position. The figure shows the coring tines 38 of the tine assemblies 36 in contact with the lawn. Movement of the tractor will cause the tine assemblies to rotate to create plugs in the lawn. It should also be noted that the chains 42 include slack when the aerator 10 is in the down position and the pivot lock pin 26 is in place to center the aerator 10 behind the tractor 44. In addition, as the pivot lock pin 26 is engaged with the top pivot arm 22 of the pivot 16, the aerator will only be able to aerate in a substantially straight line behind the tractor.

Figure 11:
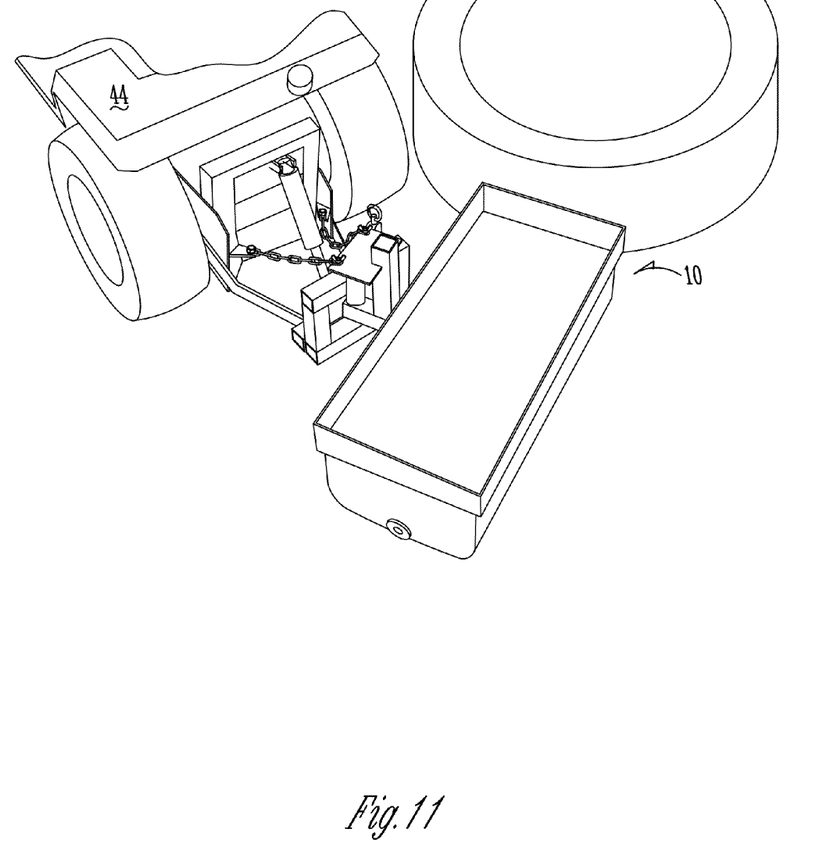
FIG. 11 is a top view of the aerator attached to the tractor and shown pivoting relative to the tractor.

FIG. 11 is a depiction of the aerator 10 in an aerating position behind the tractor 44, with the pivot lock pin 26 disengaged from the top pivot arm 22 of the pivot 16. As shown in FIG. 11, the body 18 of the aerator 10 has pivoted and rotated relative to the tractor 44. This allows the aerator to aerate the lawn around the structure shown in FIG. 11, in this instance a rock structure or garden. Therefore, the pivoting nature of the aerator 10 allows for the pivoting around all objects, which is not available with prior tow behind aerators. In addition, it should be noted that the right binder chain 42 is slack, while the left binder chain is taut. As discussed above, the binder chains aid is raising the aerator, but they also limit the amount of pivot in the aerator 10. The limiting of the rotation of the aerator prevents the aerator from tearing up a lawn.

Figure 12:
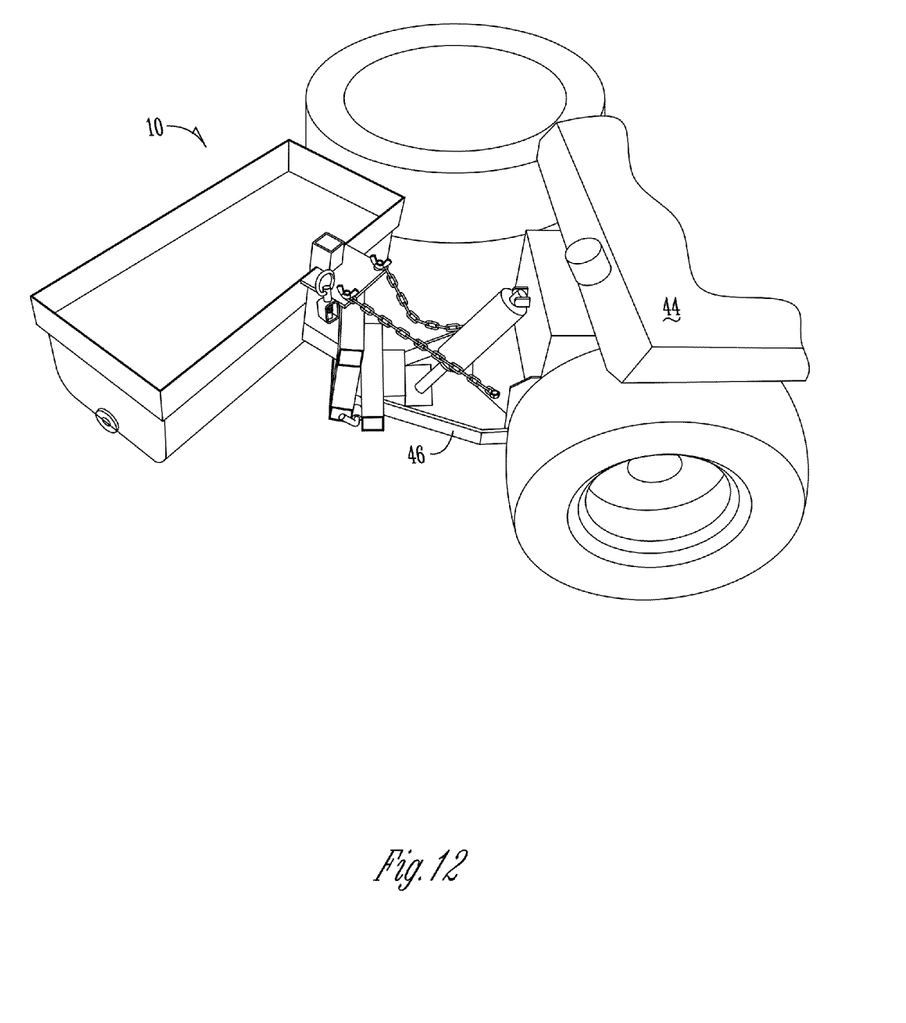
FIG. 12 is another view similar to that shown in FIG. 11.

FIG. 12 is a view similar to FIG. 11 showing the aerator 10 pivoted relative to the tractor 44 and sleeve hitch 46. Again, it is noted that the pivot lock pin 26 is disengaged from the top pivot arm 22 of the pivot 16. It is also noted that the closer chain is taut, while the inside chain is slacked. Again, the outside or closer chain is preventing too much pivoting of the aerator 10.

The binder or limiter chains 42 also provide for another advantage for the aerator 10 of the present invention. When the aerator 10 is in a position such as shown in FIG. 11 or 12, i.e., in a pivoting position, it still may be needed to quickly raise the aerator to a non-aerating position. However, in order to save time in raising the aerator 10, an operator need only operate the toggle switch of the sleeve hitch to begin raising the aerator 10. The raising of the aerator will cause the binder chains to become taut. As each chain is the same length, the chains will correct the orientation of the aerator, such that it will self-center itself upon lifting or raising of the aerator body. Once it is centered, the springed pivot lock pin will snap into the aperture through the top pivot arm 22 to lock the aerator 10 in a non-pivoting configuration. Thus, an operator need not get off the lawn or garden tractor 44 to raise and center the aerator 10. Likewise, to place the aerator from a non-pivoting configuration to a pivoting configuration, an operator need only reach behind the tractor 44 while sitting, and disengage the pivot lock pin from the top pivot arm 22 of the pivot 16 to allow the aerator 10 to pivot relative to the tractor 44.

Furthermore, as mentioned previously, the aerator includes a float 14 to allow the aerator to follow the contour of the ground as terrain changes. Thus, the tines of the aerator will always be in contact with the ground. The float includes a hinged connection between the connection 12 and the pivot 16, which may include a springed hinge connection such that the float will allow the aerator to adjust to terrain, but will reorient the aerator to a generally level position on level ground.

Figure 13:
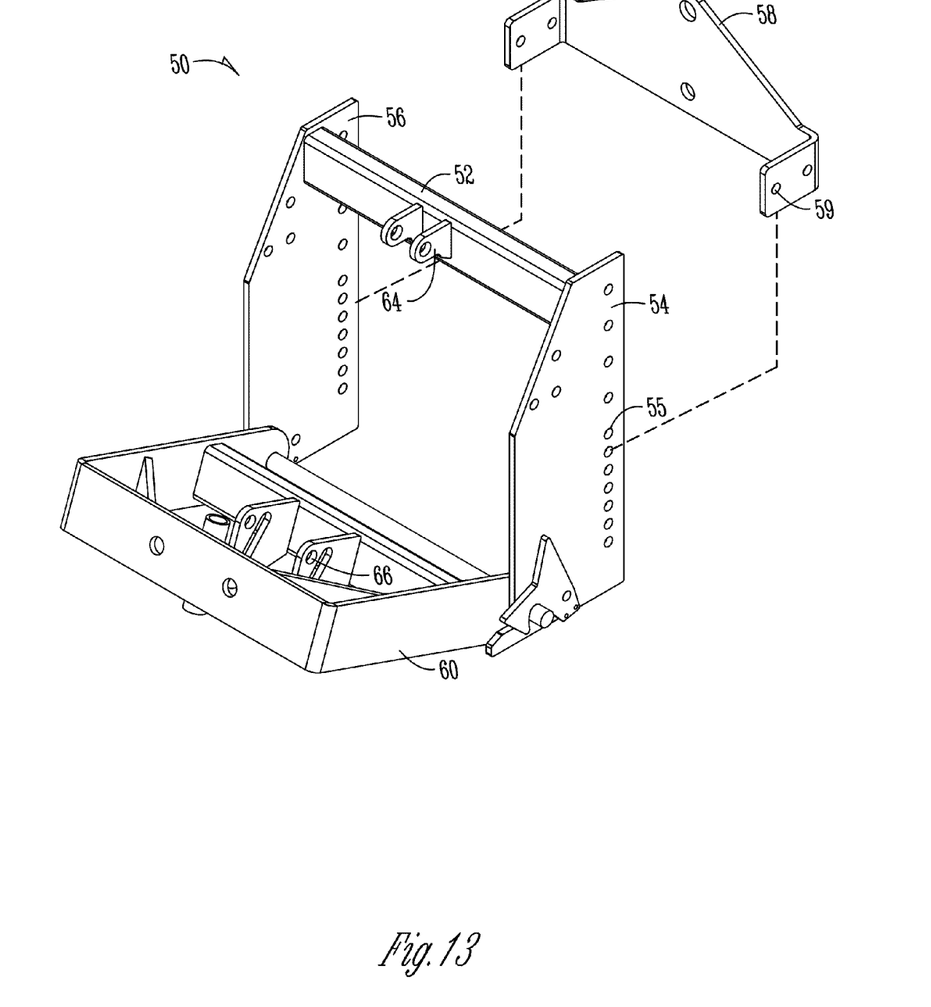
FIG. 13 is a partial exploded view of a universal sleeve hitch for use with the aerator according to the present invention.

FIG. 13 is a partial exploded view of a universal sleeve hitch 50 used to connect the aerator 10 of the invention with any make or model of garden tractor. Thus, the term "universal" is used to indicate the near limitless attachment for the aerator to a tractor. The sleeve hitch 50 allows a user to use any sleeve hitch implement, e.g., the aerator 10. Other sleeve hitch implements include grader blades, box blades, plows, discs, planters, cultivators, drag mats, sprayers, etc. The benefit of a sleeve hitch is the ability to mechanically lift and lower an implement, making it much easier to maneuver a tractor.

The universal sleeve hitch 50 shown in FIG. 13 includes a main body 52, which may comprise a metal tube. First and second mounting straps 54, 56 are connected to either side of the main body 52, such as be welding or otherwise affixing. The straps 54, 56 include a plurality of apertures 55 therethrough. A tongue plate 58 includes apertures 59 to connect the tongue plate 58 to the first and second straps 54, 56. The location of the tongue plate will be determinative on the make and model of the tractor. The universal bolt in tongue plate 58 bolts inside the straps 54, 56 at virtually any height, which allows it to match to any tractor frame. The universal mounting straps 54, 56 then tie the top of the main body to the upper portion of the tractors' frame. A mount 60 is pivotally or rotatably attached to the first and second straps 54, 56 and is used to connect to the aerator, such as connecting to the connection 12 of the aerator 10. The mount 60 may also be known as a "hitch portion". A cylinder, which may be a linear actuator, is connected between the main body 52 and the mount 60, and can be attached at the first and second actuator attaches 64, 66. The linear actuator is pinned via the upper and lower mounts 64, 66 and supplies the lift and lower power. Actuation of the linear actuator will rotate the mount 60 about the pivot points, which will raise and lower the aerator 10 between transport and aerating configurations. The aerator 10 may also include a wiring harness, toggle switch, and hardware to operate the hitch 50.

One aspect of the universal sleeve hitch 50 is that the mount 60 has two different mounting options. Option one is a simple hole that bolts the linear actuator to the hitch, which is considered a non-floating rigid mount. Option two is a slotted hole. This is considered a floating non-rigid mount, and allows an implement to float over uneven terrain under its own weight. The non-floating rigid mount will not allow an implement to float over uneven terrain occasionally forcing the operator to make adjustments via the toggle switch, it however does have an advantage in that an operator can apply down pressure to an implement if desired.

Another aspect of the universal sleeve hitch is how the mount attaches to the straps 54, 56 of the main body 52. The straps 54, 56 have cam locks that hold the mount 60 in place. These cam locks require no tools. They simply slide down over the mount 60 and lock it in place via cotter pins securing the mount 60 in place. This makes for very fast removal when one is not using the sleeve hitch 50.

As has been mentioned, there are many advantages of the present invention over the prior art. The width of the aerator and tines allows the aerator to fit through standard size gates and other passages. Furthermore, the raising and lowering of the aerator via the sleeve hitch mount allows the aerator to be backed in corners, as well as raised to cross sidewalks, driveways, porches, and the like with ease and without having to dismount from the garden tractor. The aerator can be lifted and lowered with the flip of a toggle switch that controls the cylinder of the sleeve hitch mount. Furthermore, the aerator is wider than a standard walk behind aerator. Thus, aerating may be accomplished in less time and with less energy, as an operator need not dismount from the lawn tractor during the entire aerating process.

Furthermore, as has been mentioned, the aerator 10 of the present invention is able to connect to a standard sleeve hitch mount of a regular sized garden tractor. Thus, no expensive subcompact class tractor having a three-point hitch is required. Furthermore, the aerator of the present invention allows for the aerator to pivot relative to the tractor, which is not available with standard three-point hitch configurations.

Other alternative processes obvious to those in the field of the art are considered to be included in this invention. This description is merely an example of an embodiment and limitations of the invention are not limited to the application. For instance, the exact shape and size of the aerator body need not be exact to the photos provided. Furthermore, the size, shape, and material composition of the tubes, rods, axles, and plating may be varied according to the size and requirements for the aerator. Furthermore, while the individual components are shown to be welded together, it should be appreciated that other forms of attachment are included as part of the invention.

The invention claimed is:

1. An aerator for attaching to a hitch of a garden tractor, comprising:
    a connection including a float;
    a pivot hingeably connected to the float, the pivot including a substantially horizontal top pivot arm, a bottom pivot arm, and a pivot rod rotatably connected to the top and bottom pivot arms such that said rod is rotatable independent of the top and bottom pivot arms;
    a pivot body arm extending from the pivot rod and movable with said pivot rod independent of the top and bottom pivot arms;
    a body operatively connected to the pivot body arm, the body including an enclosure and a receptacle portion at least partially above the enclosure; and
    at least one tine assembly operably connected to the enclosure, the tine assembly including a plurality of tines spaced radially about an axis.

2. The aerator of claim 1 further comprising a pivot lock pin operably connected to the pivot body arm for selectively engaging the body and the pivot.

3. The aerator of claim 1 wherein the body further comprises a box positioned above the enclosure.

4. The aerator of claim 1 wherein the pivot includes first and second side pivot arms positioned between the top and bottom pivot arms.

5. The aerator of claim 1 further comprising first and second binder chains operably connected to the pivot.

6. The aerator of claim 1 further comprising a sleeve hitch connected to the connection.

7. The aerator of claim 6 wherein the sleeve hitch is a universal hitch configured to connect the aerator to generally any garden tractor.

8. The aerator of claim 7 wherein the universal sleeve hitch comprises:
    a main body;
    first and second mounting straps positioned on opposite side of the main body;
    a tongue plate positioned between and attached to the first and second mounting straps; and
    a mount rotatably connected to the mounting straps and configured to attach to the connection.

9. The aerator of claim 8 further comprising an actuator between the main body and the mount to rotate the mount relative to the main body and straps to raise and lower the aerator.

10. The aerator of claim 1 further comprising a plurality of dividers between tine assemblies and attached to the body.

11. An aerator, comprising:
    a body enclosure with a recessed box portion at an upper portion;
    a plurality of tine assemblies rotatably connected to the body enclosure;
    a connection operatively connected to the body enclosure and configured to be connected to a sleeve hitch of a garden tractor;
    a pivot hingeably connected to the connection, the pivot including a top pivot arm, a bottom pivot arm, and a pivot rod rotatable connected therebetween such that the pivot rod is rotatable independent of the top and bottom pivot arms; and
    a pivot body arm extending from the pivot and rotatable therewith independent of the top and bottom pivot arms;
    wherein the tine assemblies comprises a plurality of hollow tine members positioned radially about an axis.

* * * * *